(12) United States Patent
Mabe et al.

(10) Patent No.: US 12,119,656 B2
(45) Date of Patent: Oct. 15, 2024

(54) HYDROGEN ENERGY STORAGE FOR POWER TIME SHIFTING

(71) Applicant: Caterpillar Inc., Peoria, IL (US)

(72) Inventors: Brandon Joseph Mabe, Houston, TX (US); Mark David Anderson, Cypress, TX (US)

(73) Assignee: Caterpillar Inc., Peoria, IL (US)

( * ) Notice: Subject to any disclaimer, the term of this patent is extended or adjusted under 35 U.S.C. 154(b) by 354 days.

(21) Appl. No.: 17/538,272

(22) Filed: Nov. 30, 2021

(65) Prior Publication Data

US 2023/0170706 A1  Jun. 1, 2023

(51) Int. Cl.
*H02J 3/38* (2006.01)
*G06Q 50/06* (2012.01)

(52) U.S. Cl.
CPC ............. *H02J 3/381* (2013.01); *G06Q 50/06* (2013.01); *H02J 2300/24* (2020.01); *H02J 2300/28* (2020.01)

(58) Field of Classification Search
CPC ...................................................... H02J 3/381
See application file for complete search history.

(56) References Cited

U.S. PATENT DOCUMENTS

| | | | |
|---|---|---|---|
| 8,310,094 B2 | 11/2012 | Yamada et al. | |
| 11,277,004 B1* | 3/2022 | Katikaneni | H02S 40/36 |
| 2004/0013923 A1* | 1/2004 | Molter | H01M 8/0656 |
| | | | 429/444 |
| 2009/0189445 A1 | 7/2009 | Strizki | |
| 2011/0100328 A1* | 5/2011 | Paul | H01M 8/186 |
| | | | 174/138 R |
| 2017/0051665 A1 | 2/2017 | Hollinger | |
| 2018/0137580 A1 | 5/2018 | Pommontarut et al. | |
| 2018/0217568 A1* | 8/2018 | Parvania | G06Q 10/06314 |
| 2018/0261860 A1* | 9/2018 | Jahnke | H01M 8/184 |
| 2019/0386491 A1* | 12/2019 | Ito | H02J 1/10 |
| 2020/0270755 A1* | 8/2020 | Modestino | C25B 9/23 |
| 2020/0373640 A1 | 11/2020 | Moden et al. | |
| 2021/0021132 A1* | 1/2021 | Tsuji | H02J 3/381 |
| 2021/0027399 A1* | 1/2021 | Mizutani | H01M 10/425 |
| 2021/0157312 A1* | 5/2021 | Cella | G01M 13/045 |
| 2023/0187964 A1* | 6/2023 | Cohn | H02J 3/381 |
| | | | 307/64 |

FOREIGN PATENT DOCUMENTS

| | | | |
|---|---|---|---|
| JP | 2017076611 A | | 4/2017 |
| WO | 2014071314 A2 | | 5/2014 |
| WO | WO2020188266 A1 | | 9/2020 |

OTHER PUBLICATIONS

European Extended Search Report for EP Patent Appln. No. 22204835.7, mailed May 3, 2023 (9 pgs).

* cited by examiner

*Primary Examiner* — Suresh Suryawanshi
(74) *Attorney, Agent, or Firm* — Lee & Hayes, P.C.

(57) ABSTRACT

An energy storage system for power time shifting is described herein. The energy storage system allows for the selection of which energy source to use. The energy storage system further allows for a determination as to whether or not excess energy should be stored, used, or sold. The energy storage system can use historical data to predict energy usage and costs in the future to further refine energy usage, storage, or sale determinations.

20 Claims, 4 Drawing Sheets

HYDROGEN ENERGY STORAGE FOR POWER TIME SHIFTING

TECHNICAL FIELD

The present disclosure relates to energy shifting. More specifically, the present disclosure relates to the generation and storage of hydrogen for meeting power supply and cost demands.

BACKGROUND

As industries electrify, i.e. increasingly use electric-powered equipment and machines, traditional sources of power such as mechanical combustion engines and turbines are being replaced with electrical motors and power transmission grid technology. The effort to do so is due to various factors. In some examples, an increased use of electrical power rather than combustion technologies in equipment can reduce greenhouse gas emissions. In other examples, an increased use of electrical power rather than combustion technologies can increase operability. For example, electrical grid, wind, and solar energy sources may be more readily available in some locations than access to gasoline, diesel or other types of combustible fuel, such as "off-grid systems." For "off-grid" application sites, such as remote mining sites, ships, or installations, hybrid systems are often used. Hybrid systems can use combustion engine-driven generator setups (gensets) and battery banks to provide a continuous power supply. In order to reduce such costs, renewable power sources, such as photovoltaic power or wind power, may be used as the primary power sources, while diesel gensets may be used as secondary power sources.

In large part the electrification trend is being driven by operational capability but also greenhouse emission reductions, therefore clean electricity sources are being adopted in increasing numbers. This is creating new challenges around storing large quantities of energy. As the scale of electrification continues to increase, the challenges of scaling energy storage solutions are also increasing, thereby creating a need for economical energy storage systems to time shift power supply of renewable green electricity to twenty-four-hour industry energy demands.

An example of a power supply system that uses energy storage is described in U.S. Patent Application No. 2020373640 to Monden et al. (hereinafter the "'640 application"). The '640 application describes a power supply system that has a hydrogen power generator that uses electrical energy from a power generator to generate hydrogen. According to various embodiments described in the '640 application, various loads can be powered either through electrical power generated using the hydrogen or hydrogen that was previously stored. The '640 application discloses that the hydrogen power generator can be adapted to charge and discharge to offset excess or deficient electrical power supply. However, although the system described in the '640 application is capable of using hydrogen, the use of the hydrogen is based on a particular load requirement. As a result, the system described in the '640 application is not configured to determine an optimal usage of hydrogen, as the use is based solely on whether or not additional energy is needed.

Examples of the present disclosure are directed to overcoming deficiencies of such systems.

SUMMARY

In an aspect of the present disclosure, an energy storage system includes a microgrid for receiving a first source of energy from a plurality of energy sources, a hydrogen generation apparatus operably connected to the plurality of energy sources, the hydrogen generation apparatus configured to use excess energy of the first source of energy from at least one of the plurality of energy sources to create hydrogen, a hydrogen gas storage for storing the hydrogen created by the hydrogen generation apparatus, a hydrogen combustion genset operably connected to the hydrogen gas storage and natural gas, the hydrogen combustion genset being capable of combusting various fuels comprising, natural gas, hydrogen, and other fuels to produce a second source of energy, and a hydrogen energy storage controller configured to provide an instruction a load manager managing a plurality of loads to use the first source of energy or the second source of energy to power at least one of the plurality of loads. The hydrogen energy storage controller includes a cost function analyzer to determine the instruction by receiving, at the hydrogen energy storage controller, first information indicating a first cost to purchase the first source of energy to power the at least one of the plurality of loads using the first source of energy; and receiving, at the hydrogen energy storage controller, second information indicating a second cost to use the second source of electrical power generated by the hydrogen combustion genset combusting the hydrogen stored in the hydrogen gas storage or by the hydrogen combustion genset combusting the natural gas, and generating the instruction to the load manager to instruct the at least one of the plurality of loads to use the first source of energy if the first cost is lower than the second cost, generating the instruction to the load manager to use the second source of energy if the second cost is lower than the first cost, or generating the instruction to the load manager to instruct the at least one of the plurality of loads to use the first source of energy if the first source of energy is a renewable source of energy. The hydrogen energy storage controller includes a communication interface to transmit the instruction to the load manager.

In another aspect of the present disclosure, a method for hydrogen energy storage for power time shifting includes loading definitions comprising operational limitations and parameters associated with one or more loads, loading inputs comprising weighting variables associated with one or more power sources, receiving power supply data comprising an identification of the one or more power sources, an availability of the one or more power sources, an amount of power output available for each of the one or more power sources, and a cost associated with a use of each of the one or more power sources, executing a cost function analyzer to determine which of the one or more power sources to use as a selected power source for the one or more loads and how much excess power is converted to hydrogen gas and stored for future use, and transmitting an output to a load manager, the output comprising an identification of the selected power source to be used by the one or more loads.

In a still further aspect of the present disclosure, a hydrogen energy storage controller includes a memory storing computer-executable instructions, and a processor in communication with the memory. The computer-executable instructions cause the processor to perform acts comprising executing a cost function analyzer to determine which of one or more power sources to use as a selected power source for one or more loads, a lowest cost power source being the selected power source, and how much excess power is converted to hydrogen gas and stored for future use. The one or more power sources include a solar energy source, a wind energy source, a power grid source, a supply of natural gas, and hydrogen gas stored in a gas storage. An output comprising an identification of the selected power source to be used by the one or more loads is transmitted to a load manager.

DETAILED DESCRIPTION

Figure 1:
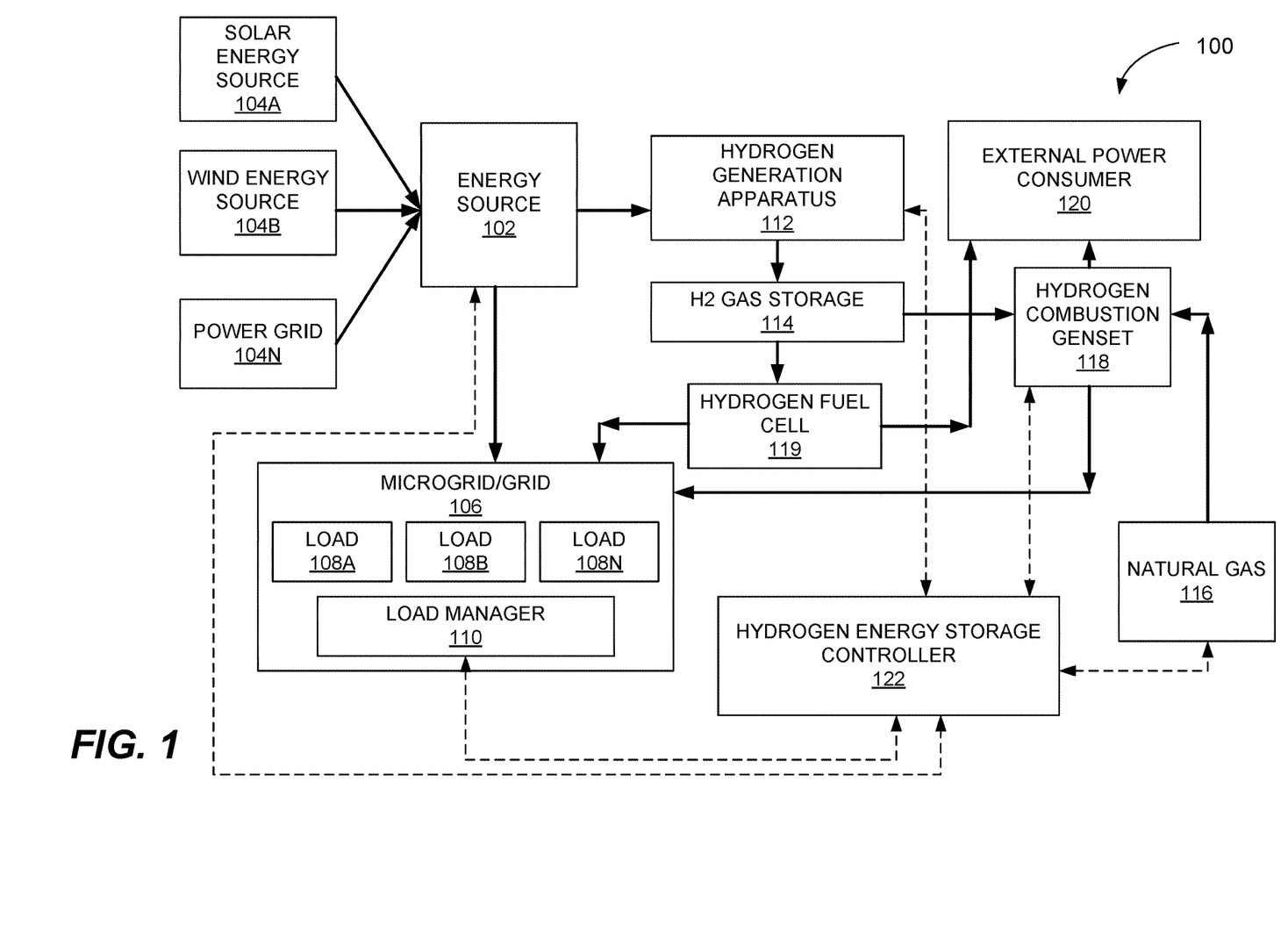
FIG. 1 illustrates an energy storage system, in accordance with one or more examples of the present disclosure.

Wherever possible, the same reference numbers will be used throughout the drawings to refer to the same or like parts. FIG. 1 illustrates an energy storage system 100, in accordance with one or more examples of the present disclosure. The example energy system 100 shown in FIG. 1 includes an energy source 102. The energy source 102 is a collection of potential sources of energy, such as solar energy source 104A, wind energy source 104B, and/or a power grid 104N. Other sources of energy, such as hydropower, may be available and are considered to be within the scope of the present disclosure. The solar energy source 104A and/or the wind energy source 104B are often considered "green" energy sources, or sources of energy that come from low or non-carbon energy sources such as the sun (solar) or the wind. The solar energy source 104A generates power using one or more solar cells. These solar cells convert energy from the sun (or other sources of light) into electrical energy. The wind energy source 104B usually is generated from one or more wind turbines that, when turned by the wind moving past the blades of the wind turbine, cause the wind turbine to turn and generate electrical energy. The power grid 104N is typically an electrical energy supply system provided by a utility using energy transmission wires and other equipment to transfer electrical power generated at one location to another location.

The energy source 102 is connected to a microgrid/grid 106. The microgrid/grid 106 is an electrical system that is local to a particular site, whereas the power grid 104N is typically used to describe an entire electrical system. The microgrid/grid 106 receives energy from the energy source 102, and, is configured to supply that energy to one or more loads 108A-108N. The loads 108A-108N are various types of electrical loads that may be found in a site such as a remote drilling site and can include, but are not limited to, work machines, lights, appliances, and the like. The loads 108A-108N can be purely electrical loads or may be hybrid systems that use electrical and combustion energy as power sources. A load manager 110 is used to control the energy provided to the loads 108A-108N and to manage the microgrid/grid 106. In some examples, the load manager 110 is a computer-based system that receives input from various sources to control some aspects of the loads 108A-108N. As will be described in more detail, below, the load manager 110 is used in some instances to instruct control systems (not shown) in one or more of the loads 108A-108N as to which energy type to use, when to use which energy type, and/or how much of an energy type to use.

For example, in some situations, there may be "excess" energy, or energy that is produced or available but not used by the loads 108A-108N. This excess energy may come from one or more of the solar energy source 104A, the wind energy source 104B, and/or the power grid 104N. For example, the load 108A may be an excavator that is used only during the daytime. However, the wind energy source 104B may be producing energy throughout the night because of an availability of wind during the night. In another example, energy produced during the day by the solar energy source 104A may exceed the amount of energy need by one or more of the loads 108A-108N during a daytime work shift. Rather than simply not using the excess energy generated by one or more of the solar energy source 104A, the wind energy source 104B, and/or the power grid 104N, the excess energy may be used to power a hydrogen generation apparatus 112, explained in more detail, below. In some examples, the hydrogen generation apparatus 112 is an electrolyzer that uses electricity to break water into hydrogen and oxygen in a process called "electrolysis." Through electrolysis, the hydrogen generation apparatus 112 creates hydrogen gas. An electrolyzer includes a cathode (negative charge), an anode (positive charge) and a membrane (not shown). During the electrolysis process, the electrolyzer directs electrical energy to the anode and cathode and causes the water ($H_2O$) to split into its component molecules, hydrogen ($H_2$) and oxygen ($O_2$). The oxygen that is produced can be captured and stored or released into the atmosphere. In some examples, other methods of generating hydrogen may be used and are considered to be within the scope of the presently disclosed subject matter. In another example, the hydrogen generation apparatus 112 is a steam methane reformer. Steam methane reforming (SMR) uses chemical reactions which convert water and methane, such as natural gas 116, into hydrogen and carbon dioxide. In some examples, the natural gas includes methane and other gases. The hydrogen gas is then purified to a quality specified by the customer. Thus, rather than using an electrolyzer, or in addition to using the electrolyzer, the hydrogen generation apparatus 112 can be an SMR reactor using, for example, the natural gas 116. The hydrogen gas produced by the hydrogen generation apparatus 112 is stored in an $H_2$ gas storage 114. The hydrogen gas can either be stored in the $H_2$ gas storage 114 as a compressed gas or liquefied. The $H_2$ gas storage 114 is a vessel, pressurized and/or chilled vessel, a geophysical structure such as a cave, and the like. The presently disclosed subject matter is not limited to any form of the $H_2$ gas storage 114. Thus, the excess electrical energy from the energy source 102 is used to generate gaseous or liquified hydrogen, and this hydrogen is stored for use at a later time. In this way, the excess electrical energy is stored for later use, or "time shifted." As used herein, "time shifting" refers taking energy in one form, storing that energy in a second form, and using that stored energy at a later time when the use can be more economical. The energy storage system 100 also provides for energy source redundancy in the event that one or more of the sources associated with the energy source 102 become unavailable.

In addition to the excess energy from the energy source 102, there may be other sources of excess energy or alternate energy sources from the ones provided by the energy source 102. For example, the location of the energy storage system 100 may have additional energy sources available. If the location is a drilling site, there may be methane ($CH_4$) 116, or natural gas, from, for example, natural gas sources in the ground found during drilling operations. The natural gas 116, in some examples, is used as a source of electrical energy to one or more of the loads 108A-108N rather than, or in addition to, the energy source 102. To convert the natural gas 116 to electrical energy for use by one or more of the loads 108A-108N, the natural gas 116 may be combusted in a hydrogen combustion generator set (genset) 118. The genset 118 is a hydrogen-fueled gas turbine that combusts hydrogen and/or natural gas (i.e. the natural gas 116) to produce electrical energy. The genset 118 is a combustion system capable of converting hydrogen ($H_2$) gas or natural gas ($CH_4$) into turbine mechanical energy, which in turn powers a generator to produce electrical energy. In some examples, the genset 118 may be a turbine or an internal combustion engine that potentially combusts fuels comprising diesel, natural gas, gasoline, hydrogen, and other fuels, or combinations thereof, and are considered to be within the scope of the presently disclosed subject matter.

In some examples, hydrogen stored in $H_2$ gas storage 114 may, in addition to or in place of using the genset 118, be converted to electricity using hydrogen fuel cell 119. In general, a hydrogen fuel cell includes a catalyst at an anode that separates hydrogen molecules into protons and electrons, which take different paths to a cathode. The electrons go through an external circuit, creating a flow of electricity. Thus, rather than combusting hydrogen in the genset 118 to generate electricity, hydrogen may be used in the fuel cell 119 to generate electricity. It should be noted that the following description is provided in terms of using the genset 118, though the same principles of operation apply to the fuel cell 119. It should be noted that in some examples, one or more of the loads 108A-108N may be hybrid systems that can use either electrical energy or other forms of energy, such as the natural gas 116. Thus, in these examples, the natural gas 116 can be used directly by one or more of the loads 108A-108N.

There are various economic factors that come into consideration in any system in which more than one source of energy is available for use. Sometimes these various sources can be a type of energy, such as electrical power, natural gas 116, and the like. In other examples, these types of energy can be energy readily available in its current form (such as electrical energy from the power grid 104N) or energy that is produced by some form of conversion process, such as using the hydrogen stored in the $H_2$ gas storage 114 to create electricity by combusting the hydrogen in the genset 118. Besides the costs of purchasing (or using) energy from providers such as the power grid 104N, in some examples, the price of selling energy sources back into "commerce" is another economic factor. Although there are other factors, three of the fundamental "costs" associated with energy are the cost to purchase the particular energy source, the cost to use the particular energy source, and the cost to sell the energy source to a third party, such as the external power consumer 120. The external power consumer 120 is typically a utilities company or independent power producer/supplier. The external power consumer 120 is often configured to purchase electrical energy, which the external power consumer 120 thereafter sells to other electrical power consumers.

To determine an efficient or profitable use of energy, a hydrogen energy storage controller (hereinafter "energy controller") 122 is provided. The energy controller 122 is a computer-based system that is in communication with various components of the energy system 100. The energy controller 122 communicates with or receives data from the hydrogen generation apparatus 112, the genset 118, the load manager 110, and the energy source 102. The data received from these various sources are used by the energy controller 122 to provide instructions to the load manager 110. The energy controller 122 is configured to provide instructions or data to the load manager 110 so that the load manager 110 can determine how to manage loads, as described above. For example, the load manager 110 is configured to instruct the load 108A to use electrical power from the power grid 104N or the natural gas 116. The energy controller 122, based on determinations described herein, instructs the load manager 110 that the natural gas 116 is not available as a potential energy source for the load 108A. In some examples, the energy controller 122 controls the load manager 110, whereby the instruction received from the energy controller 122 is executed by the load manager 110. In other examples, the load manager 110 receives the instructions from the energy controller 122 and determines if any operational changes need to be made for any of the loads under the control of the load manager 110. Having the load manager 110 in control rather than the energy controller 122 can be useful if the energy controller 122 does not have all the data or operational information of the loads available to the load manager 110. Thus, in this example, the energy controller 122 could be outputting an instruction that is does not comport with the current configurations or statuses of the loads. The presently disclosed subject matter is not limited to any particular configuration of control between the load manager 110 and the energy controller 122, whereby in some instances, the functionality may be performed by the same module or component.

The energy controller 122 determines, among other possibilities, 1) which source of energy to use, 2) whether to store excess energy from the energy source 102 in the $H_2$ gas storage 114 or convert the excess energy from the energy 102 to electrical energy using the genset 118 for sale to the external power consumer 120, and/or 3) whether to use the natural gas 116 to generate electrical energy for one or more of the loads 108A-108N or convert a portion or all of the natural gas 116 to electrical energy using the genset 118 for sale to the external power consumer 120. In various examples, the determination of what type of energy to use in a setting, such as an industrial setting, depends on various factors. One factor may be the cost of the energy itself. Various types of energy, such as wind, gasoline, diesel, solar, electric power grid, biomass, and the like, have various costs associated with the access and/or purchase of the energy from a source. For example, gasoline or diesel can be readily available even in the most remote of locations, but the prices of those sources change on a daily basis. In another example, energy from an electrical power grid may be obtainable in various locations, but the costs may also fluctuate with respect to other energy sources. In further examples, the costs of wind and solar may also experience fluctuations in a manner similar to the aforementioned energy sources.

The costs (or prices) of these and other energy sources often move up or down independently of each other. For example, a large storm such as a hurricane in the Gulf of Mexico can affect the price of gasoline or diesel, but often has little to no effect on the present cost of electrical energy (which is often set by government regulation). In another example, while the price of wind or solar is often low when equipment costs have been accounted for, environmental conditions such as low winds or overcast skies can make the cost of those forms of energy essentially too high.

The energy storage system 100 of FIG. 1 provides various functions that can provide a degree of flexibility in the purchase, storage, use, and/or sale of energy. In some examples, various forms of energy may be received from various sources, stored in various manners, and sold back or used in various forms depending on various factors, including economic factors. The energy storage system 100 of FIG. 1 uses excess "green" energy to electrolyze hydrogen. The hydrogen is stored and used in a mechanical combustion cycle engine or turbine in order to time shift variable wind or solar power through weekly (or seasonal) demand cycles. This demand can come from a series of utility commitments, microgrid loads, and/or power supply agreements.

To determine what source of energy is used or sold, in some examples, the energy controller 122 uses a cost function. The cost function is used to calculate a cost per kW based on one or more variables. In some examples, the variables include, but may not be limited to utility cost, power purchaser with purchase price, engine efficiency and fuel source costs, and engine efficiency and carbon dioxide ($CO_2$) emission price. Utility cost is the price charged by a utility supplier such as the utility company providing electrical power through the power grid 104N. The power purchaser price is the price that the external power consumer 120 will pay for electrical power. Engine efficiency and fuel source costs are an estimation of the cost for an engine to use a particular energy source. Some sources of energy are used more efficiently by engines or have a higher power density than other sources of energy. Engine efficiency and $CO_2$ emission price is a calculation based on greenhouse gas emissions, such as $CO_2$, that are charged to the producer of the emissions. These charges can be offset by carbon credits or may be an additional fee charged to the producer These fees may also be "internal" fees that raise the cost of the emissions internally to effectuate a goal, such as increasing the use of low or non-greenhouse gas emitting processes.

These and other costs are input into the energy controller 122. The energy controller 122 has various functions, including a determination of a cost of the use of a particular energy source either on a macro-level, i.e. the entire energy storage system 100, and/or on a micro-level, i.e. for a particular load 108A-108N. The energy controller 122 receives various inputs and determines whether or not a particular source is to be used, stored, or sold back as electricity to a power purchaser. However, in some examples, the energy controller 122 uses one or more additional factors for various cost function determinations. For example, in some instances, the load 108A efficiency of using diesel at a particular time is more efficient or more cost effective than using the natural gas 116. This example can result when during the startup of a machine, diesel energy is a more efficient or more cost-effective form of energy over other forms such as natural gas or electrical power. Thus, during startup, the cost to use the natural gas 116 can be greater than the cost of using diesel. Therefore, the energy controller 122 can send to the load manager an output that during startup, the load 108A is to use diesel, and after startup the load 108 is to use the natural gas 116.

As noted above, an additional cost function in some examples is the economic cost of creating greenhouse gases such as carbon dioxide ($CO_2$). In some examples, to offset the environmental cost of exhausting greenhouse gasses into the atmosphere, an entity can purchase carbon credits or can pay fines levied by governmental organizations. Continuing with the example, if the cost of exhausting greenhouse gasses during startup is enough of an expense, the energy controller 122 can determine that even during startup, it is more economical to use the natural gas 116 than diesel.

Figure 2:
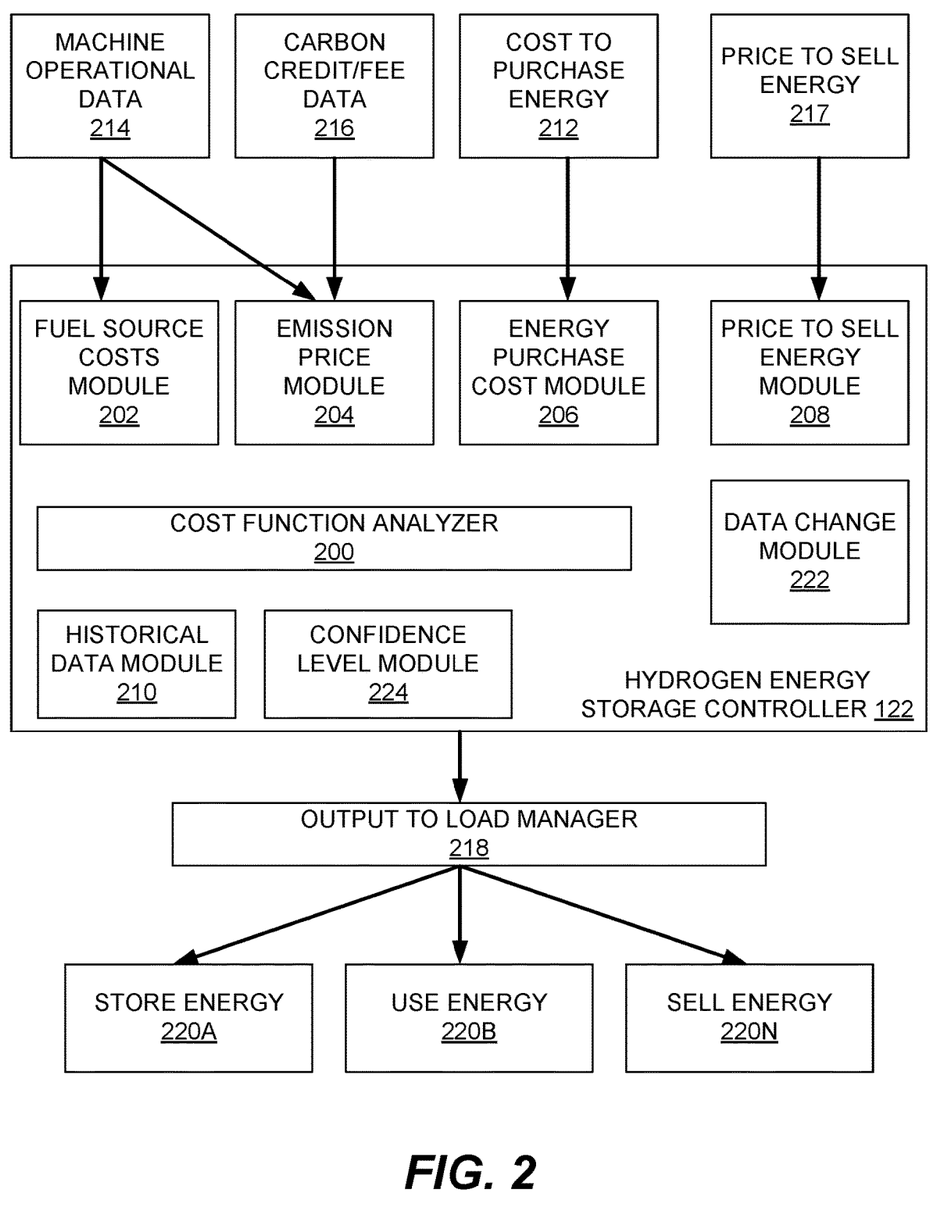
FIG. 2 is a component-level diagram of a hydrogen energy storage controller, in accordance with one or more examples of the presently disclosed subject matter.

As discussed above, the energy system 100 of FIG. 1 uses an $H_2$ gas storage 114 to store energy provided in one form, such as the natural gas 116 or the energy from the energy source 102 energy, and store that energy in a second form, such as hydrogen in the $H_2$ gas storage 114, to a time in which the use of the energy is more economical or cost effective while, in some instances, providing for the energy requirements of one or more of the loads 108A-108N. There are various inputs that can be used to make a determination as to which form of energy is to be used, inputs such as operational data of the loads 108A-108N, prices (current and projected) to purchase various forms of energy, sale prices (current and projected) to sell various forms of energy, and the like. As noted above, the hydrogen energy storage controller 122 receives the various inputs and performs calculations to determine which type of energy to use, and when. FIG. 2 describes the hydrogen energy storage controller 122 in more detail.

FIG. 2 is a component level diagram of the hydrogen energy storage controller 122, in accordance with one or more examples of the presently disclosed subject matter. The energy controller 122 includes a cost function analyzer 200, a fuel source costs module 202, an emission price module 204, an energy purchase cost module 206, and a price to sell energy module 208. It should be understood that costs and sale prices relating to the cost function analyzer 200, the fuel source costs module 202, the emission price module 204, the energy purchase cost module 206, and the price to sell energy module 208 described herein are merely exemplary inputs to the cost function analyzer 200, as other inputs may be used and are considered to be within the scope of the presently disclosed subject matter.

As noted above in FIG. 1, in some examples, there can be various sources of energy, such as the energy source 102 and the natural gas 116 of FIG. 1. Further, there can be sources of excess energy, such as excess energy produced by the solar energy source 104A or the wind energy source 104B, or the hydrogen stored in the $H_2$ gas storage 114. The natural gas 116 can also be considered an excess energy source if the amount of the natural gas 116 exceeds the needs of the loads 108A-108N of the energy storage system 100 of FIG. 1.

During operation of the loads 108A-108N, the energy controller 122 determines which energy source or excess energy source to use, and as a result, which, if any, of the excess energy source to store or sell. In some examples, the energy controller 122 determines the use of energy on a micro, or load 108A-108N level. In some examples, if the loads 108A-108N are individually optimized for cost, there is a high likelihood that the energy storage system 100 itself is optimized for cost.

FIG. 2 will be explained by way of example and not by way of limitation in relation to loads 108A-108N. In some examples, a load can be equipment such as computers, lights, and the light. In other examples, a load can be a work machine. The term "work machine" as used in this disclosure refers to any machine that performs some type of work operation associated with an industry, such as mining, construction, farming, landscaping, or transportation. The principles of this disclosure could be applied to multiple types of work machines having various capabilities, such as a wheel loader, driller, pump, excavator, dump truck, backhoe, motor grader, material handler and the like. In some examples, the work machine can receive as an energy source for use one or more forms of energy, such as electrical and diesel in a hybrid work machine. As noted above with respect to the loads 108A, 108B, 108N illustrated in FIG. 1, an example work machine may receive electrical energy from the energy source 102, which can supply the electrical energy from the solar energy source 104A, the wind energy source 104B, and/or the power grid 104N. A work machine may also receive electrical energy from electrical power generated by the genset 118 using either hydrogen stored in the H$_2$ gas storage 114 or the natural gas 116. It should be noted that there may be other sources of electrical energy (such as water turbine energy) that are not illustrated in FIG. 1. The presently disclosed subject matter is not limited to only the energy sources illustrated, as the principles described herein apply to other sources of energy.

With reference to FIG. 2, the cost function analyzer 200 determines 1) which source of energy to use and 2) what to do with any excess energy as it relates to the particular work machine. Thus, for each source of energy, the cost function analyzer 200 receives as input the cost to purchase the energy and the cost to use the particular energy for the particular work machine. In FIG. 2, the energy purchase cost module 206 receives as an input the cost to purchase energy 212, typically provided by an energy supplier (such as a utilities company). The cost to use energy has several components illustrated by way of example in FIG. 2. The fuel source costs module 202 provides the cost of the work machine using the fuel on an efficiency basis. For example, a work machine may be more efficient in using one source of fuel than another. This efficiency can be translated to a cost or used as a multiplier. For example, the cost to purchase energy 212 may be $4/kW, but the work machine may be only 30% efficient when using that form of energy. Thus, the cost is $4/kW divided by 30%, or $13/kW. The machine operational data 214 can also be the cost to convert an energy source into another energy source for use by a work machine. In an example, the genset 118 may be 20% efficient in converting H$_2$ gas from the H$_2$ gas storage 114 to electrical energy, and 30% efficient in converting the natural gas 116 to electrical energy. In a still further example, a work machine can be a hybrid machine that is capable of using either or both diesel energy in a combustion engine or electrical power. In this example, the efficiency of each form of energy usage during various stages of operation and conditions of the work machine can be input as machine operational data 214 to the fuel source costs module 202.

In some examples, there may be costs associated with using various forms of energy. As noted above, the combustion of hydrocarbons, such as diesel and the natural gas 116 can produce greenhouse gases. In order to reduce a carbon footprint, the user of the work machine can buy carbon credits to offset the production of greenhouse gases or may pay a fee, or both. Carbon credit/fee data 216 is input to the emission price module 204. The cost function analyzer 200 receives the inputs from the energy purchase cost module 206, the fuel source costs module 202, and the emission price module 204 to determine which source of energy to use. In one example, the following data in the cost to purchase energy 212 is provided to the energy purchase cost module 206: the solar energy source 104A—unavailable; the wind energy source at $9/kW; the power grid 104N at $8/kW; H$_2$ conversion in the genset 118 from the H$_2$ gas storage at $2/kW; and the conversion of the natural gas 116 to electrical power in the genset 118 at $10/kW. In this example, the cost function analyzer 200 receives the information and transmits an output (instruction) to load manager 218 to have the load 108A use the lowest cost energy, or the H$_2$ conversion in the genset 118 from the H$_2$ gas storage at $2/kW. Some of the output to load manager 218 includes an output to store energy 220A, an output to use energy 220B, or an output to sell energy 220N. In some examples, the hydrogen energy storage controller 122 will prioritize the use of renewable energy sources even if the costs associated with the use of other forms of energy are lower.

However, the analysis described above is focused on the current costs and prices of purchasing energy. In some examples, it can be beneficial to also include the potential of selling energy back to a utility or consumer. Continuing with the example above, the cost function analyzer 200 receives a price to sell energy into the price to sell energy module 208. While the cost function analyzer 200 determines that it is more cost effective to use the lowest cost energy, or the H$_2$ conversion in the genset 118 from the H$_2$ gas storage 114 at $2/kW (continuing with the current example), the cost function analyzer 200 receives from the price to sell energy 217 that a utility will purchase electrical energy at $12/kW. The cost function analyzer 200 uses machine operational data 214 to determine that the cost to convert the natural gas 116 to electrical power in the genset 118 is $10/kW and the cost to produce the natural gas 116 is $0.4/kW (a natural gas supply from a drilling operation), whereas the cost to convert the H$_2$ in the H$_2$ gas storage 114 using the genset 118 is $2/kW and the cost of the conversion of the various forms of energy into the H$_2$ using the hydrogen generation apparatus 112 is $4/kW. Thus, continuing with the example, the cost functional analyzer 200 determines that it is more cost effective to use the lowest cost energy, or the H$_2$ conversion in the genset 118 from the H2 gas storage 114 at $2/kW, to power the load 108A and use the natural gas 116 to produce electrical energy using the genset 118 and sell that energy to the external power consumer 120.

In a modification of the current example, the cost functional analyzer 200 can use historical data from a historical data module 210 as an input. The historical data module 210 stores energy pricing, cost, and efficiency data over a period of time. The historical data module 210 can also have stored therein historical load data of one or more of the loads. This historical data can be used by the cost function analyzer 200 to project costs, prices, and operational efficiency. Continue with the present example, the historical data module 210 provides to the cost function analyzer 200 data that indicates that while electrical energy from the power grid 104N is currently at $8/kW, historically during a certain period of time, certain weather or economic conditions, or a period of the year, the cost has historically increased to $20/kW. Thus, the cost function analyzer 200 can determine that, while currently the cost of energy from the power grid 104N is than energy from the conversion of H$_2$ from the H$_2$ gas storage 114 at $2/kW, it would be more economically beneficial to keep the H2 in storage (and perhaps increase the amount of H$_2$ stored) in order to offset the potential significant increase in cost of electrical energy from the power grid 104N. In this example, the cost function analyzer 200 determines that the consumption of a slightly more expensive energy source so that the significantly less expensive power source (the H$_2$ gas) is used when energy prices are significantly greater. The same type of analysis can be used for excess energy provided by the solar energy source 104A or the wind energy source 104B. While slightly more expensive in the near term, using their energy to power the hydrogen generation apparatus 112 to make H$_2$ gas can provide a significant cost savings later on or a future cost.

As with any data, there may be variables about how useful or accurate the data may be. In the example illustrated in FIG. 2, the cost function analyzer 200 receives as an input data from a confidence level module 224. The confidence level module 224 calculates a confidence level of the data to provide the cost function analyzer 200 a means to determine the reliability of the data. It should be noted that the confidence interval of the data can be used and is considered to be within the scope of the presently disclosed subject matter. There are various methods of calculating confidence levels or intervals on data, with the presently disclosed subject matter not limited to any particular method. The confidence level module 224 is programmed with a confidence level (or interval), below which the data is not used. Some examples of inputs to the confidence level module 224 can be the age of the data in the historical data module 210. Data, such as weather data that affects energy prices, that is from a significant amount of time prior to the use of the data can be less reliable than data collected more proximate to the time of the calculation. Thus, recent data can be designated with a higher confidence level than aged data. In another example, a certain amount of data may cause the calculation of a higher confidence level than a relatively lower amount of data.

In some examples, the data used by the cost function analyzer 200 changes in various intervals. For example, the machine operational data 214 often changes in real-time as the machine is used. The data associated with machines that are performing under significant loads or conditions (such as an excavator) often changes faster than machines that are more computational or perform lower energy jobs (such as computers). The machine operational data 214 can also be modified by user-modes. A user mode may include a specific weighting of data associated with the machine operational data 214, such as seasonal or location information. The cost functional analyzer 200 can be programmed to update the output to load manager 218 in periodic intervals, such as once per day, once every minute, and the like. The cost functional analyzer 200 can also be programmed to update the output to the load manager 218 when a change in the data provided to the cost function analyzer 200 changes using the data change module 222. The data change module 222 has stored therein the prior data provided by the machine operational data 214, the carbon credit/fee data 216, the cost to purchase energy 212, and the price to sell energy 217. When data is provided by one of those data sources to the data change module 222, the data change module 222 compares the data to the prior version of the data stored by the data change module 222. Upon a detection of a change in the data between the current data and the prior data, the data change module 222, provides a notice or indication to the cost function analyzer 200 that data has changed. The cost function analyzer 200 reperforms the cost function analysis and updates the output to load manager 218 using the new data.

Using the cost function analyzer 200 provides for a selection of energy sources based not only on an availability, as is the case in conventional systems, but also based on an economic basis for using those energy sources. The cost function analyzer 200 receives inputs relating to the cost to purchase or produce energy as well as the cost to use energy. The cost function analyzer 200 utilizes the availability of hydrogen stored in the $H_2$ gas storage 114 to shift the time in which various sources of energy can be used, explained in more detail in FIG. 3, below.

Figure 3:
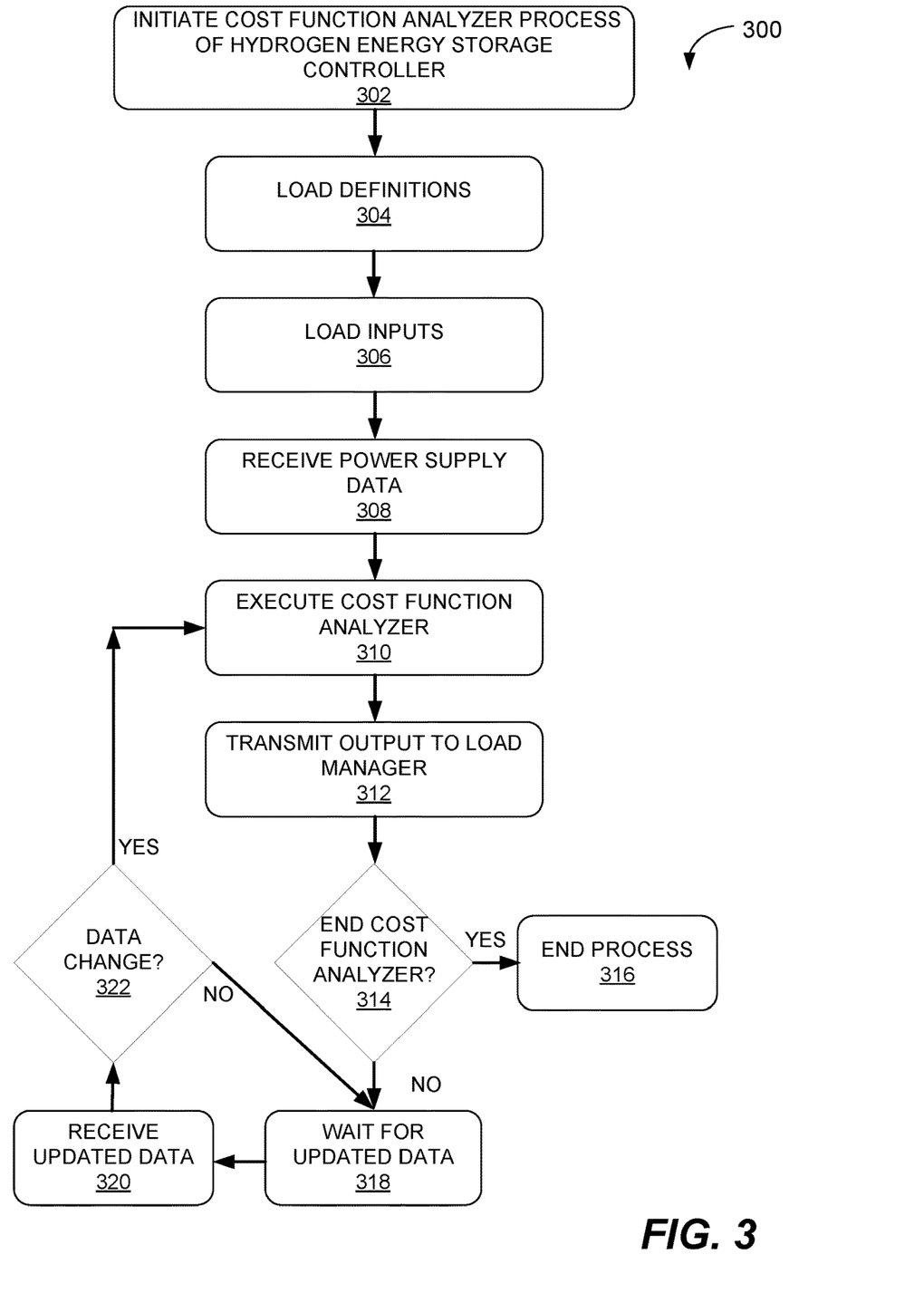
FIG. 3 illustrates a flow chart indicative of a process for hydrogen energy storage and power time shifting, in accordance with one or more examples of the present disclosure.

FIG. 3 is an illustrative process 300 for hydrogen energy storage for power time shifting, in accordance with some examples of the present disclosure. The process 300 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The process 300 commences at 302, the cost function analyzer 200 of the hydrogen energy storage controller 122 is initiated. As discussed above, it may be necessary or desirable to optimize the energy usage of a system, such as the energy storage system 100 of FIG. 1. When various sources of energy are available for use by various loads having different functional aspects, as well as the potential for the availability of excess energy, the cost function analyzer 200 is used to determine what machines or loads use what form of energy and when.

At 304, definitions are loaded into the cost function analyzer 200 and/or are otherwise accessed by the hydrogen energy storage controller 122. The definitions include, but are not limited to, operational limitations, and parameters associated with one or more loads 108A-108N. For example, a hydraulic fracturing machine may have operational parameters such as instantaneous power demand, a power cost threshold, automated load control limits, transient limits, and the like. The definitions provide an input to the cost function analyzer 200 that allows the cost function analyzer 200 to determine more accurately costs associated with each of the loads 108A-108N. These definitions may be loaded from the machine operational data 214 of FIG. 2.

At 306, the hydrogen energy storage controller 122 receives one or more inputs. The inputs can be variables that are supplied by a user or another entity that can be used to refine the calculations performed by the cost function analyzer 200. The inputs can include, but are not limited to, weighting variables associated with one or more of the energy sources. For example, "green" energy sources can be weighted to be more selectable, whereas hydrocarbon sources such as diesel can be weighted to be less selectable. In this example, the cost to purchase green energy can have a weighting variable of 0.8, thereby reducing the cost of the green energy in the cost function analyzer 200. In the same manner, diesel fuel or other polluting sources of energy can have a weighting variable of 1.2, thereby increasing the cost of the polluting sources of energy in the cost function analyzer 200. Thus, in this example, the reduced cost of the green energy is relative to the increased cost of the diesel using the weighting variable. Other variables can be used and are within the scope of the presently disclosed subject matter.

At 308, the hydrogen energy storage controller 122 receives the power supply data (or definitions). The power supply definitions can include, but are not limited to, an identification of the various power sources, the availability of each power source, the amount of energy that can be supplied by each power source, an amount of instantaneous and continuous power that can be supplied by each source of energy, and partial loading/transient performance of the various power sources. With regard to the partial loading/transient performance, when under a load, some power sources experience performance issues. When determining which energy source a load is to use, the cost function analyzer 200, in some examples, needs to know how placing another load onto the energy source will affect the energy source. The cost function analyzer 200 can use power supply data to project potential issues with placing another load on the energy source, such as an overload condition or a condition where the energy source, while perhaps not at capacity, is near operational limits. Thus, in some examples, even if a particular energy source has a lower cost, if placing another load onto the energy source can cause issues, the cost function analyzer 200 can disregard that energy source and find the next, lowest cost energy source. The issues can arise based on various factors, including the ability of the energy source to handle the additional load. In some examples, when at or near capacity, energy sources can act erratically or even fail.

At 310, the cost function analyzer 200 of the hydrogen energy storage controller 122 calculates which energy source is the most optimal energy source to use with respect to economic factors, as well as performance factors in some examples. The cost function analyzer 200 can use the definitions, the inputs, and the power supply data, as well as prices to purchase and prices to sell energy, to determine which energy source to use. In some examples, the cost function analyzer 200 can use the historical data module 210 to project costs as an input to the current calculation, as described in FIG. 2.

At 312, the hydrogen energy storage controller 122 the output to load manager 218 to the load manager 110. The load manager 110 thereafter instructs the particular load 108A-108N to use the determined energy source.

At 314, the hydrogen energy storage controller 122 determines whether or not to end the cost function analyzer 200 based on whether or not the process 300 is to continue. If the decision is to end the operation, the process 300 continues to operation 316, where the cost function analyzer 200 operation is ended.

If the decision at 314 is to not end the cost function analyzer 200, at 318, the system waits for updated data. In some examples, as explained in FIG. 2, the cost function analyzer 200 will automatically, on a periodic basis, recalculate the cost function analysis. In other examples, as in the process 300 of FIG. 3, the cost function analyzer 200 updates when data is changed.

At 320, the updated data is received. In this example, the updated data is received by the data change module 222, which compares the updated data with the previously stored data in operation 322. A change will cause the data change module 222 to notify the cost function analyzer 200 to update its analysis.

At 322, the hydrogen energy storage controller 122 determines whether or not the updated data is different than the previously stored data. If at operation 322 the data change module 222 determines that the updated data is not different than the previously stored data, the process 300 continues to operation 318, where the system waits for updated data. If at operation 322 the data change module 222 determines that the updated data is different than the previously stored data, the process 300 continues to operation 310 and recommences the analysis process.

The process 300 shows the use of various inputs, such as those at 304, 306, and 308, used by the cost function analyzer 200 of the hydrogen energy storage controller 122 to determine which source of energy to use based on a cost associate with the use of that energy. In some examples, the cost function analyzer 200 can prioritize the use of renewal energy sources and can determine if it is more cost effective to use stored hydrogen or the natural gas to produce and sell electrical energy to an external power consumer. In some examples, the cost function analyzer 200 can prioritize the use of renewal energy sources based on a carbon content, i.e. a carbon "footprint," of a source. The hydrogen energy storage controller 122 includes components and functionality that allows the hydrogen energy storage controller 122 to perform the calculations described above and to communicate instructions to various systems or components, such as the load manager 110 of FIG. 1, described in more detail in FIG. 4.

Figure 4:
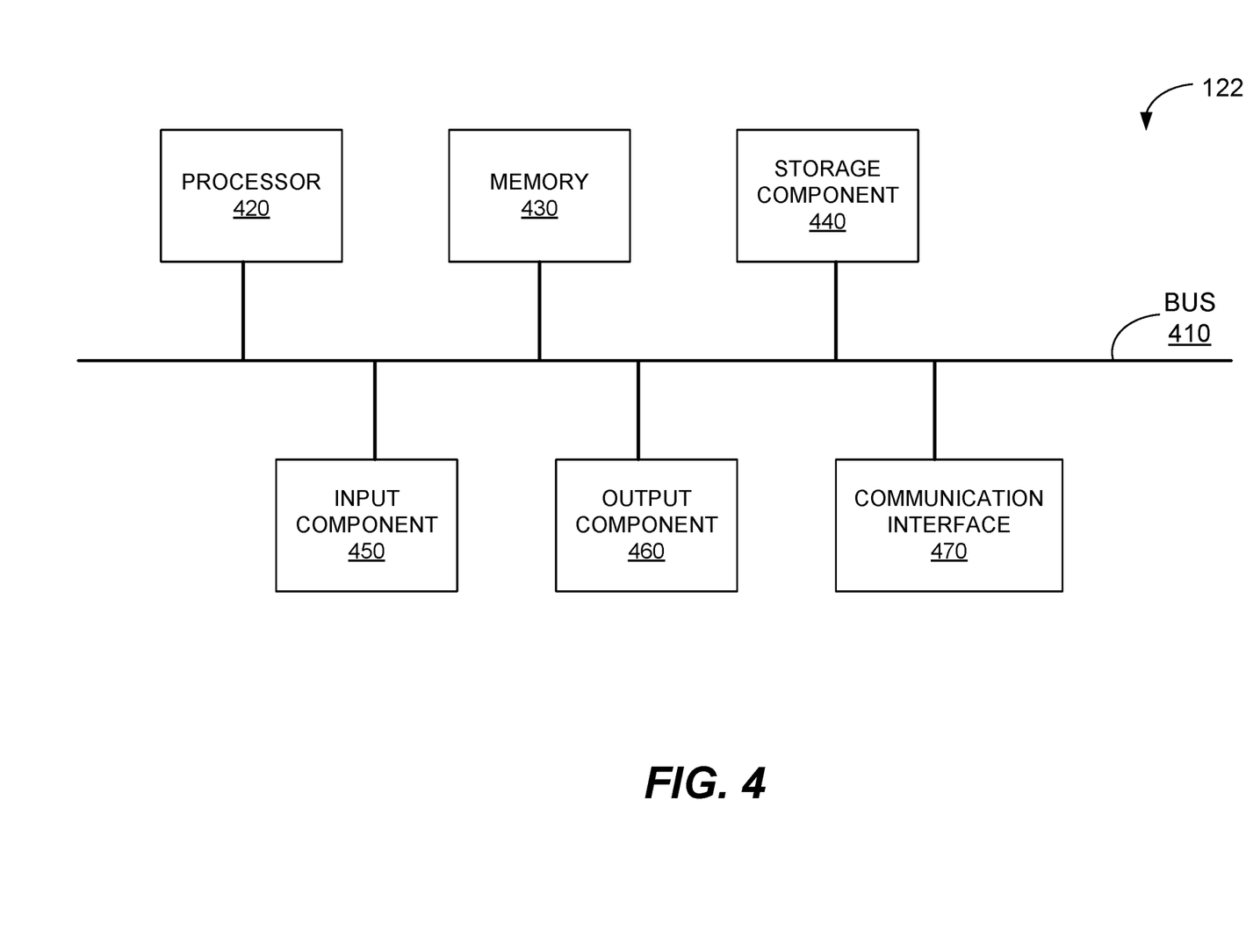
FIG. 4 is a diagram of example components of a hydrogen energy storage controller, in accordance with one or more examples of the present disclosure.

FIG. 4 is a diagram of example components of the hydrogen energy storage controller 122, in accordance with one or more examples of the present disclosure. As shown in FIG. 4, the hydrogen energy storage controller 122 include a bus 410, a processor 420, a memory 430, a storage component 440, an input component 450, an output component 460, and a communication interface 470. Bus 410 includes a component that permits communication among the components of the hydrogen energy storage controller 122. The processor 420 is implemented in hardware, firmware, or a combination of hardware and software. The processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 420 includes one or more processors capable of being programmed to perform a function. For example, the processor 420 is used to perform the functions of the cost function analyzer 200, the data change module 222, and to process the historical data from the historical data module 210. These and other functions are executed using the processor 420.

The memory 430 includes a random access memory (RAM), a read only memory (ROM), and/or another type of dynamic or static storage device (e.g., a flash memory, a magnetic memory, and/or an optical memory) that stores information and/or instructions for use by the processor 420. The memory 430 can be used to store instructions for the execution of, by way of example and not limitation, the cost function analyzer 200, the data change module 222, and to process the historical data from the historical data module 210. The memory 430 can also be used to store previous data to be used by the data change module 222 and historical data to be used by the historical data module 210, by way of example, The storage component 440 stores information and/or software related to the operation and use of the hydrogen energy storage controller 122. For example, the storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 450 includes a component that permits the hydrogen energy storage controller 122 to receive information, such as via user input (e.g., a touch screen display, a keyboard, a keypad, a mouse, a button, a switch, and/or a microphone), the definitions in operation 304 of process 300, the inputs in operation 306 of process 300, and the power supply data 308 of process 300, by way of example. Additionally, or alternatively, the input component 450 may include a sensor for sensing information (e.g., a global positioning system (GPS) component, an accelerometer, a gyroscope, weather data, and/or an actuator). The output component 460 includes a component that provides output information from the hydrogen energy storage controller 122 (e.g., a display, a speaker, and/or one or more light-emitting diodes (LEDs)), such as the output to load manager 218 of FIG. 2.

The communication interface 470 includes a transceiver-like component (e.g., a transceiver and/or a separate receiver and transmitter) that enables the hydrogen energy storage controller 122 to communicate with other devices, such as via a wired connection, a wireless connection, or a combination of wired and wireless connections. The communication interface 470 may permit the hydrogen energy storage controller 122 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like, to communicate with the load manager 110. In some examples, the communication interface 470 is used to receive various data associated with the load manager 218 of FIG. 2 using wired or wireless communications. The data may be received from local sources, such as the loads 108A-108N, or from remote sources such as weather information from a weather service, pricing information from the external power consumer 120 or the power grid 104N, and the like.

The hydrogen energy storage controller 122 may perform one or more processes described herein. The hydrogen energy storage controller 122 may perform these processes based on to the processor 420 executing software instructions stored by a non-transitory computer-readable medium, such as the memory 430 and/or the storage component 440. A computer-readable medium is defined herein as a non-transitory memory device. A memory device includes memory space within a single physical storage device or memory space spread across multiple physical storage devices.

Software instructions may be read into the memory 430 and/or the storage component 440 from another computer-readable medium or from another device via the communication interface 470. When executed, software instructions stored in the memory 430 and/or the storage component 440 may cause the processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the hydrogen energy storage controller 122 may include additional components, fewer components, different components, or differently arranged components than those shown in FIG. 4. Additionally, or alternatively, a set of components (e.g., one or more components) of the hydrogen energy storage controller 122 may perform one or more functions described as being performed by another set of components of the hydrogen energy storage controller 122.

INDUSTRIAL APPLICABILITY

The present disclosure relates generally to a system that provides for time shifting of energy. In some examples, an energy usage system can determine which available source of energy should be used for a particular load based on performance and cost considerations. Various examples of the energy system described herein use hydrogen stored in a storage container to allow for a shifting of when a particular energy source is used. A particular energy source, such as electricity, can be used at a particular time by a load or can be used to produce hydrogen for use later one.

Further, excess energy can be stored as hydrogen gas in an $H_2$ gas storage and used as a hedge against projected rising or falling energy costs. For example, there may be an excess of the natural gas 116, but the energy storage system, based on historical data, knows that energy costs in a period of time during the year is significant. Therefore, rather than using the excess natural gas 116 at that particular time for a load, the energy storage system can determine that it is more cost effective to store the excess energy as hydrogen in the $H_2$ gas storage 114 for use during the time of high energy costs. As a result, the systems and methods described herein can provide for the energy needs of one or more loads, while providing those energy needs in an economically advantageous manner.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An energy storage system, the system comprising:
   a microgrid for receiving a first source of energy from a plurality of energy sources;
   a hydrogen generation apparatus operably connected to the plurality of energy sources, the hydrogen generation apparatus configured to use excess energy of the first source of energy from at least one of the plurality of energy sources to create hydrogen;
   a hydrogen gas storage for storing the hydrogen created by the hydrogen generation apparatus;
   a hydrogen combustion genset operably connected to the hydrogen gas storage and natural gas, the hydrogen combustion genset being capable of combusting fuel comprising natural gas, diesel, gasoline, or hydrogen to produce a second source of energy; and
   a hydrogen energy storage controller configured to provide an instruction to a load manager managing a plurality of loads to use the first source of energy or the second source of energy to power at least one of the plurality of loads, the hydrogen energy storage controller comprising:
   a cost function analyzer to determine the instruction by:
      receiving, at the hydrogen energy storage controller, first information indicating a first cost to purchase the first source of energy to power the at least one of the plurality of loads using the first source of energy;
      receiving, at the hydrogen energy storage controller, second information indicating a second cost to produce the second source of energy from the excess energy of the first source of energy and to use the second source of energy generated by the hydrogen combustion genset combusting the hydrogen stored in the hydrogen gas storage or by the hydrogen combustion genset combusting the natural gas; and generating the instruction to the load manager to instruct the at least one of the plurality of loads to use the first source of energy if the first cost is lower than the second cost, generating the instruction to the load manager to use the second source of energy if the second cost is lower than the first cost, or generating the instruction to the load manager to instruct the at least one of the plurality of loads to use the first source of energy if the first source of energy is a renewable source of energy; and a communication interface to transmit the instruction to the load manager.

2. The energy storage system of claim 1, wherein in addition to the cost to purchase the first source of energy, the first cost further comprises a cost to use the first source of energy based on an efficiency of the at least one of the plurality of loads when using the first source of energy.

3. The energy storage system of claim 2, wherein generating the instruction to the load manager further comprises instructing the load manager to instruct the at least one of the plurality of loads to use a third source of energy when a cost of using the third source of energy is lower than the first cost and the second cost.

4. The energy storage system of claim 1, further comprising a hydrogen fuel cell operably connected to the hydrogen gas storage and the natural gas, the hydrogen fuel cell being capable of producing a third source of energy.

5. The energy storage system of claim 1, wherein the hydrogen energy storage controller further comprises a data change module to detect a change in the first information or the second information.

6. The energy storage system of claim 5, wherein upon an indication that either the first information or the second information has changed, the hydrogen energy storage controller causes the cost function analyzer to reperform the operation of determining the instruction.

7. The energy storage system of claim 1, wherein the second cost to use the second source of energy generated by the hydrogen combustion genset combusting the hydrogen stored in the hydrogen gas storage or by the hydrogen combustion genset combusting the natural gas comprises a cost to generate the natural gas.

8. The energy storage system of claim 7, wherein the second cost comprises a price that an external power consumer will pay to receive the second source of energy, wherein if the first cost is lower than the second cost, the hydrogen energy storage controller instructs the hydrogen combustion genset to produce the second source of energy to sell to the external power consumer.

9. The energy storage system of claim 1, wherein the renewable source of energy comprises a solar energy source or a wind energy source.

10. The energy storage system of claim 1, wherein the natural gas comes from a natural gas source provided during drilling operations.

11. A method for hydrogen energy storage for power time shifting, the method comprising:
loading definitions comprising operational limitations and parameters associated with one or more loads;
loading inputs comprising weighting variables associated with one or more power sources;
receiving power supply data comprising an identification of the one or more power sources, an availability of the one or more power sources, an amount of power output available for each of the one or more power sources, and a cost associated with a use of each of the one or more power sources;
executing a cost function analyzer to determine which of the one or more power sources to use as a selected power source for the one or more loads and how much excess power of the one or more power sources is converted to hydrogen gas and stored for future use; and
transmitting an output to a load manager, the output comprising an identification of the selected power source to be used by the one or more loads.

12. The method of claim 11, wherein executing the cost function analyzer further comprises determining that stored hydrogen gas is to be used as a selected power source.

13. The method of claim 11, wherein the cost function analyzer uses a cost function analysis, wherein the cost function analysis comprises a determination of a lowest cost power source of the one or more power sources, the lowest cost power source being a selected power source.

14. The method of claim 13, wherein the cost function analysis further comprises projecting future cost associated with the use of each of the one or more power sources using historical data.

15. The method of claim 11, further comprising:
receiving updated data for at least one of the one or more power sources;
determining that the updated data is different than previously stored data for the at least one of the one or more power sources; and
re-executing the cost function analyzer to determine which of the one or more power sources to use as a selected power source for the one or more loads based on the updated data.

16. The method of claim 11, wherein at least one of the one or more power sources comprises natural gas from a natural gas source during drilling operations.

17. The method of claim 11, further comprising initiating a hydrogen generation apparatus to convert excess power to hydrogen gas, wherein the hydrogen generation apparatus comprises an electrolyzer or a steam methane reformer.

18. A hydrogen energy storage controller, comprising:
a memory storing computer-executable instructions; and
a processor in communication with the memory, the computer-executable instructions causing the processor to perform acts comprising:
executing a cost function analyzer to determine which of one or more power sources to use as a selected power source for one or more loads, a lowest cost power source being the selected power source, and how much excess power is converted to hydrogen gas and stored for future use, wherein the one or more power sources comprises:
a solar energy source;
a wind energy source;
a power grid source;
natural gas; and
the hydrogen gas converted from the excess power of the one or more power sources, the hydrogen gas stored in a gas storage; and
transmitting an output to a load manager, the output comprising an identification of the selected power source to be used by the one or more loads.

19. The hydrogen energy storage controller of claim 18, wherein the computer-executable instructions for executing the cost function analyzer to determine the one or more power sources to use as the selected power source comprises instructions for:
    receiving machine operational data;
    receiving carbon credit/fee data;
    a cost to purchase energy from each of the one or more power sources; and
    a price to sell electrical energy generated by a genset using the natural gas to a power purchaser.

20. The hydrogen energy storage controller of claim 18, wherein the computer-executable instructions for executing the cost function analyzer to determine the one or more power sources to use as the selected power source comprises instructions for:
    receiving historical data from a historical data module; and
    projecting future costs of at least one of the one or more power sources based on the historical data received from the historical data module.

\* \* \* \* \*